United States Patent Office 3,316,966
Patented May 2, 1967

3,316,966
SAND CONSOLIDATION METHOD
Cleveland Dear, Jr., Houston, Tex., assignor, by mesne assignments, to Esso Production Research Company, Houston, Tex., a corporation of Delaware
No Drawing. Filed Jan. 30, 1964, Ser. No. 341,397
6 Claims. (Cl. 166—33)

This invention relates to the treatment of wells, such as hydrocarbon productive wells, wherein the fluid producing formation is an unconsolidated or poorly consolidated sand or where difficulty has been experienced in keeping sand in place in fractures produced in a hydrocarbon productive formation for the purpose of stimulating the productivity of the well. More specifically, the invention relates to techniques for consolidating sand particles in hydrocarbon productive formations wherein a resinous liquid is used for the purpose of binding loose sand particles firmly together.

The use of liquid resinous materials for the purpose of sand consolidation in oil and gas wells has been practiced for a number of years. While success has been achieved with sand consolidation in some wells, complete failure has resulted in other wells. For the most part, the failures have been either in not obtaining consolidation of the sand or in too greatly lowering the permeability of the formation. The most costly type of failure results when there is too great a reduction in permeability, inasmuch as expensive techniques are required to restore permeability to the formation. In general, it can be said that it is desired to coat sand grains with a layer of resin sufficiently thick to bind the sand grains rigidly together, but thin enough to not appreciably reduce the size of the pore spaces between sand grains so that there may be sufficient permeability for production purposes.

In accordance with the teachings of the present invention, sand consolidation is effected by admixing an epoxy resin and a polymerizing catalyst therefor with a petroleum solvent for epoxy resin having between 5 and 90 volume percent aromatic content, said volume percent expressed as volume percent of the petroleum solvent, and from 0.01 volume percent to 2 volume percent of a bonding agent, said volume percent expressed as volume percent of the whole mixture, selected from the group consisting of

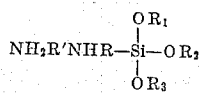

where R and R' are aliphatic or aromatic radicals from $C_1$ to $C_{20}$, and $R_1$, $R_2$, and $R_3$ are aliphatic chains in the range of from $C_1$ to $C_3$, and

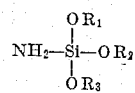

where $R_1$, $R_2$, and $R_3$ are alkyl groups between $C_1$ and $C_3$. In the above formula, the radicals designated R and R' in the first structural formula, and the radicals designated $R_1$, $R_2$, and $R_3$ in both formulae may be all alike, all different, or in any combination. The mixture is injected into the unconsolidated earth formation. After a time interval of at least two hours, the formation is produced to remove therefrom the remaining liquid content of the mixture.

The present invention makes use of those thermosetting resins known as epoxy-type resins. Epoxy resins are preferred in the practice of the invention because it has been found that they provide excellent compressive strength, have high adhesion to sand, and require less resin for satisfactory results than other types of thermosetting resins. In particular, it has been found that sand particles are somewhat preferentially epoxy wet, i.e., the surfaces of sand particles tend to coat with epoxy resin in preference to water, crude oil, or other connate fluids in hydrocarbon-containing earth formations. The epoxy resins are diglycidal ethers of bisphenol A obtained by reaction between epichlorohydrin and bisphenol A using carefully controlled additions of caustic soda to control the pH neutralizing the hydrochloric acid formed in the reaction. The pH is maintained just below the end point of phenolphthalein, about 8 to 8.5. The epoxy resins suitable for use with the invention have at least two reactive epoxy groups in their molecule and are represented by the formula:

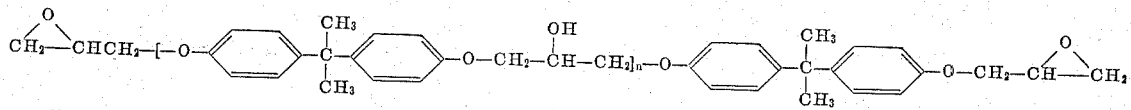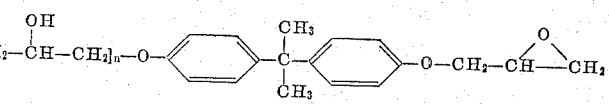

where $n$ is an integer having a value of 1 or a greater number.

Also used in connection with the invention are curing agents, known as hardeners or accelerators, for the thermosetting resin. The hardeners or accelerators have the property of catalyzing the hardening reaction of the thermosetting resin at low temperatures. The preferred epoxy resins may be cured or hardened in the following manner: (1) direct linkage between the epoxy groups by the use of tertiary amines of the general formula $R_3N$; (2) linkage of the epoxide groups with aryl or alkyl hydroxyls such as alhohols (ROH), with alcohols and tertiary amines (ROH+$R_3N$), or with di- or tri-hydric phenols

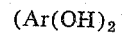

or Ar(OH)$_3$); and (3) cross linkage with curing agents such as polyfunctional primary or secondary amines (ROH) (NH$_2$) or (ROH)$_2$ (NH), with dibasic acids or anhydrides, R(COOH)$_2$ or Ar(COOH)$_2$, with polyfunctional phenols plus curing agent

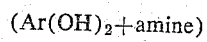

In the sense used here, R indicates an alkyl group and Ar is the aryl group.

There are many amines, dibasic acids, and acid anhydrides that will serve as curing agents. Diethylene triamine, diethylamino propylamine, ethylene diamine, triethylene triamine, tridimethyl amino methyl phenol (DMP-30, made by Rohm and Haas and the preferred catalyst for use with the present invention), benzyldimethylamine, metaphenylenediamine, and 4,4'-methylene diamiline, are typical of the amine curing agents for epoxy resins. The acid anhydrides suitable for this purpose are illustrated by oxalic, phthalic, pyromellitic dianhydride and dodecenyl succinic anhydride.

In the practice of the invention, the epoxy resin is dissolved in a petroleum solvent containing at least 5 vol. percent aromatic hydrocarbons. It should be noted at this point that epoxy resins are not soluble in aliphatic hydrocarbons but are extremely soluble in aromatic hydrocarbons. In connection with the present invention, it is desired to use a solvent wherein the epoxy resin is soluble to a degree between the solubility that it exhibits with aromatic and with aliphatic hydrocarbons. The solubility should be such that the resin will polymerize and will precipitate from the solvent when its molecular weight increases to a desired value. Generally speaking, a suitable solvent will have between 5 and 90% aromatic hydrocarbon content, and between 10 and 95% aliphatic hydrocarbon content. The preferable range for the constituents, however, is between 30 and 80% aromatic content and between 20 and 70% aliphatic content. Increasing aromaticity of the solvent will result in an increasing length of time for the polymerizing epoxy resin to precipitate from the solvent; it also results in the precipitation of a very soft, unsuitable plastic. The aromatic solvent that can be used includes benzene, toluene, and like aromatics either in pure form or diluted with oil. The aliphatic hydrocarbons that can be used are diesel oil, kerosene, white oil and other liquid fractions that are devoid of aromatic hydrocarbons. Various known laboratory techniques can be used to determine suitable mixtures of aromatic and aliphatic hydrocarbons for use with specific mixtures of epoxy resin and catalytic hardeners therefor. For example, assuming that epoxy resin has been mixed with a known hardener therefor in a specific ratio of constituents, the mixture can be dissolved in a pure aromatic hydrocarbon. The resulting mixture can be divided into a number of samples, and various different amounts of an aliphatic hydrocarbon can be added thereto. The time required for the polymerized epoxy resin to precipitate out of the resulting solutions can be noted, and the mixture having the desired precipitating time can be used for use in the specific formation to be treated, it being previously assured that the precipitation results in the yield of a proper volume of good quality plastic.

It is important that the liquid composition chosen for consolidating a specific earth formation in accordance with the invention have at least the viscosity of the fluid resident in the earth formation. Generally speaking, the viscosity of the sand consolidating liquid compositions will be in the range of 0.2 to 100 cp. The resin-solvent ratio should be such that the amount of resin in the mixture is between 3 and 50 vol. percent of the petroleum solvent in the mixture. Furthermore, it is preferred that this range be between 3 to 20 vol. percent. It is necessary that the hardener-resin ratio be such that the hardener is between 5 and 90 vol. percent of the resin in the solution, and preferably in the range of 40 to 80 vol. percent. The resulting liquid solution to be injected into the unconsolidated earth formation must be a clear homogeneous liquid from 0.5 to 2 hours prior to phase separation of the constituents thereof in the earth formation. The bonding agents suitable for use with the invention are those included in the formulas given above. Specific chemical agents which may be used for this purpose are 2,aminoethyl-aminopropyl-trimethoxy silane;
2,aminoethyl-aminopropyl-tripropylene oxide silane;
2,aminoethyl-aminopropyl-triethylene oxide silane;
2,aminomethyl-aminopropyl-trimethoxy silane;
2,aminopropyl-aminopropyl-trimethoxy silane;
1,trimethoxy-2,aminoethyl-2,aminopropyl disilane;
1,triethylene oxide-2,aminoethyl-2,aminopropyl disilane;
1,tripropylene oxide-2,aminoethyl-2,aminopropyl disilane;
1,trimethoxy-2,aminomethyl-2,aminopropyl disilane;
1,trimethoxy-2,aminopropyl-2,aminopropyl disilane;
1,trimethoxy-2,aminoethyl-2,aminoethyl disilane; and
aminotriethoxy silane.

The preferred agents are the compounds 2,aminoethyl-aminopropyl-trimethoxy silane, which is a product manufactured and marketed by the Dow-Corning Corporation, Midland, Michigan, under the trademark Z–6020, and the compound aminotriethoxy silane, which is a product marketed and manufactured by the Linde Company of Niagra Falls, N.Y., under the trademark A–1100.

In the practice of the invention, epoxy resin is dissolved in a solvent selected as described above and in the volume percentages specified above. The hardeners are then added in the volume percentages previously specified. To this mixture is added between 0.01 and 2 vol. percent (of the total mixture) of a bonding agent selected as described above. The depth of the formation manifestly is one of the factors determining the amount of time required to inject the liquid into the formation after it is mixed, so it can be appreciated that this will be one of the most important factors determining the specific solvent used in connection with the invention.

As soon as possible after the mixture has formulated at the earth's surface, it is pumped into the earth formation to be consolidated. This can be done through a tubing string in the usual manner. The tubing string may be packed off near the lower end thereof to expedite injection of the liquid into the formation. If necessary, straddle packers may be used in order to spot the liquid mixture over a zone that is giving particular trouble. The liquid sand consolidating composition is injected into the sand to a depth of from 0.1 to 10 feet from the borehole and is followed into the borehole by a liquid such as oil or water. Pumping is stopped as soon as the following liquid reaches the bottom of the borehole.

The sand consolidating liquid is allowed to remain in the formation for a period of from 2 to 72 hours until the polymerized epoxy resin has polymerized and settled on the sand grains. The sand grains are preferentially wetted by the epoxy resin. However, when the sand grains are wet with water, the epoxy resin may not displace all of the water, with the result that the formation around the borehole is not consolidated. The addition of the bonding agents has been found to result in satisfactory consolidation of the sand in virtually every case in which it has been tried.

After a period of from 2 to 72 hours, the fraction of the sand consolidating material remaining in liquid form is produced out of the formation. It has been found that the addition of the bonding agents has not only resulted in satisfactory sand consolidation of the sand, but also has resulted in a very high remanent permeability to connate formation fluids.

The following examples illustrate laboratory experiments wherein formation conditions were simulated to study the effectiveness of the formation. In Examples I, II, and IV, a sand consolidating liquid was used having the following formulation:

|  | Volume percent |
|---|---|
| Heavy aromatic naphtha | [1] 58.74 |
| Diesel oil | [2] 26.70 |
| CIBA 6005 epoxy resin | [3] 8.90 |
| CIBA pentamide 825 | [4] 5.34 |
| Rohn and Haas DMP–30 | [4] 0.18 |
| Dow-Corning Z–6020 | [5] 0.14 |

[1] Inert.
[2] Carriers.
[3] Epoxy resin.
[4] Hardeners.
[5] Bonding agent.

*Example 1*

A sand tube 1 inch in diameter and 4 inches long was packed with an oil field sand having grains of erratic size and shape between 80 and 120 mesh. The sand packed tube was immersed in a constant temperature water bath maintained at 120° F. The core was first saturated with water containing 5 wt. percent NaCl. This water saturation was reduced to a minimum by flowing diesel oil through the sand, thereupon 200 cc. of the above-specified sand consolidating mixture was pumped through the sand, after which flow was suspended for 19 hours. Thereafter, 400 cc. of 5 wt. percent salt water and 400 cc. of diesel oil were separately flowed through the core. A 1½ inch long sample of the core was cut and broken in compression. The compressive strength was found to be 2190 p.s.i.

*Example II*

In a similar sand tube, the above-identified mixture was pumped through the sand with the sand in a dry condition. The sand was removed from the tube after the mixture had been allowed to cure for a period of 19 hours, and two 1½ inch long samples were cut therefrom. One sample was immediately broken in compression and was found to have a compressive strength of 2470 p.s.i. Through the second sample was flowed 400 cc. each of 5 wt. percent salt water and diesel oil. This sample was then broken in compression and was found to have a compressive strength of 1782 p.s.i. This experiment demonstrated that hydrolysis of the bonding agent appears to be necessary for maximum effectiveness of the treatment.

*Example III*

A sand consolidating liquid as described above was formulated except that a bonding agent such as Dow-Corning Z–6020 was omitted from the mixture of chemicals. After 19 hours, 400 cc. each of 5 wt. percent salt water and diesel oil were flowed through the core. The sand was then removed from the tube and found to be soft in spots. A 1½ inch long sample was cut and broken in compression. The compressive strength of the gross sample was found to be only 879 p.s.i. Because of its relative weakness and unconsolidated portions, it is believed that the use of a formulation omitting the bonding agent would have resulted in an unsatisfactory consolidation.

*Example IV*

This experiment was run exactly as was Example I except that 400 cc. of heavy aromatic naphtha was used as a buffer fluid between the diesel oil and the consolidating chemical mixture. The core was cured, treated, and sampled exactly as was the core of Example I. The compressive strength of this core was found to be 2105 p.s.i., which indicates that the consolidation is due to precipitating, polymerizing epoxy resin rather than to desolubilized epoxy resin.

Although the embodiments disclosed in the preceding specification are preferred, other modifications will be apparent to those skilled in the art which do not depart from the broadest aspects of the scope of the invention.

What is claimed is:

1. A method of consolidating an incompetent earth formation comprising:

admixing an epoxy resin and a polymerizing catalyst therefor with a petroleum solvent for epoxy resin having an aromatic hydrocarbon content of between 5 and 90 vol. percent of the solvent and an aliphatic hydrocarbon content of between 10 and 95% of the solvent, and from .01 to 2 vol. percent of the total mixture, of a bonding agent selected from the group consisting of (a) 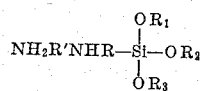

where R is an aliphatic hydrocarbon radical, R' is selected from the group consisting of aliphatic and aromatic hydrocarbon radicals, R and R' are from $C_1$ to $C_{20}$, $R_1$, $R_2$, and $R_3$ are aliphatic hydrocarbon radicals in the range from $C_1$ to $C_3$, and (b) 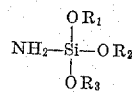

where $R_1$, $R_2$, and $R_3$ are alkyl groups between $C_1$ and $C_3$;

injecting the mixture into said incompetent earth formation; and after a time interval of at least two hours, producing the formation to remove therefrom the remaining liquid content of said mixture.

2. The method of claim 1 wherein the bonding agent is aminotriethoxy silane.

3. The method of claim 1 wherein the bonding agent is 2,aminoethyl-aminopropyl-trimethoxy silane.

4. A method of consolidating an incompetent, petroleum bearing earth formation comprising:

forming a mixture of from 2 to 30 vol. percent epoxy resin, 2 to 20 vol. percent of a polymerizing catalyst therefor, 50 to 98 vol. percent of a petroleum solvent for epoxy resin having at least 5 vol. percent aromatic hydrocarbon content and at least 10 vol. percent aliphatic hydrocarbon content, and from .01 to 2 vol. percent of a bonding agent selected from the group consisting of (a) 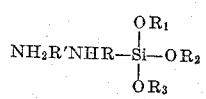

where R is an aliphatic hydrocarbon radical, R' is selected from the group consisting of aliphatic and aromatic hydrocarbon radicals, R and R' are from $C_1$ to $C_{20}$, $R_1$, $R_2$, and $R_3$ are aliphatic hydrocarbon radicals in the range from $C_1$ to $C_3$, and (b) 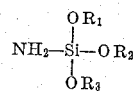

where $R_1$, $R_2$, and $R_3$ are alkyl groups between $C_1$ and $C_3$;

injecting the mixture into said incompetent earth formation; and after a time interval of at least two hours, producing the formation to remove therefrom the remaining liquid content of said mixture.

5. The method of claim 4 wherein the bonding agent is aminotriethoxy silane.

6. The method of claim 4 wherein the bonding agent is 2,aminoethyl-aminopropyl-trimethoxy silane.

References Cited by the Examiner
UNITED STATES PATENTS

| | | | |
|---|---|---|---|
| 3,199,590 | 8/1965 | Young | 166—33 |
| 3,208,525 | 9/1965 | Caldwell et al. | 166—33 |
| 3,221,814 | 12/1965 | Hower | 166—33 |
| 3,250,330 | 5/1966 | Smith | 166—33 |

FOREIGN PATENTS 928,127  6/1963  Great Britain.

CHARLES E. O'CONNELL, *Primary Examiner.*

S. J. NOVOSAD, *Assistant Examiner.*